May 29, 1951 W. T. RAINEY, JR., ET AL 2,554,503
TUBE SEALING APPARATUS
Filed July 13, 1945 2 Sheets-Sheet 1
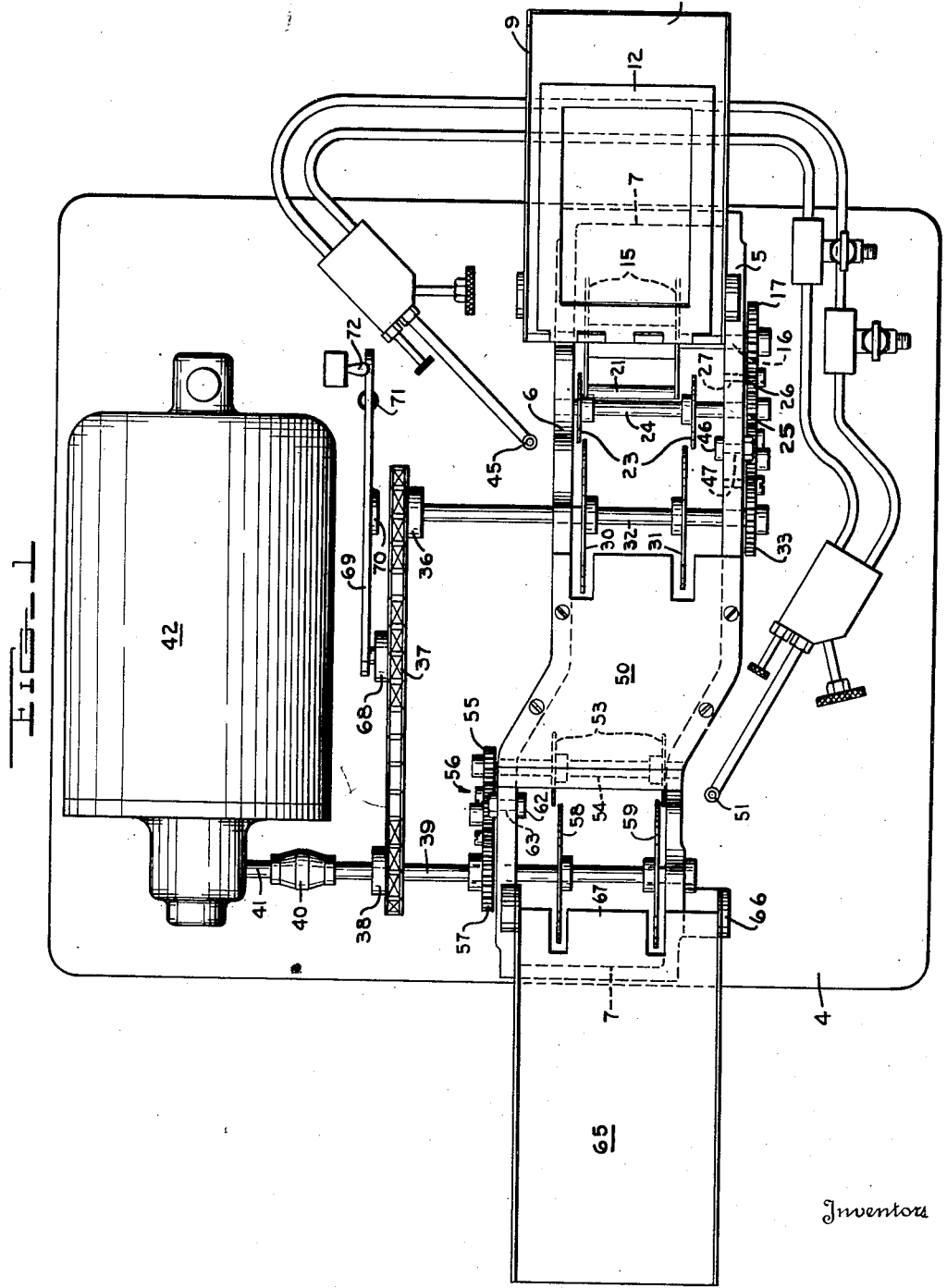
Inventors
John A. Krynitsky
William T. Rainey Jr.
By Ralph L. Chappell
Attorney

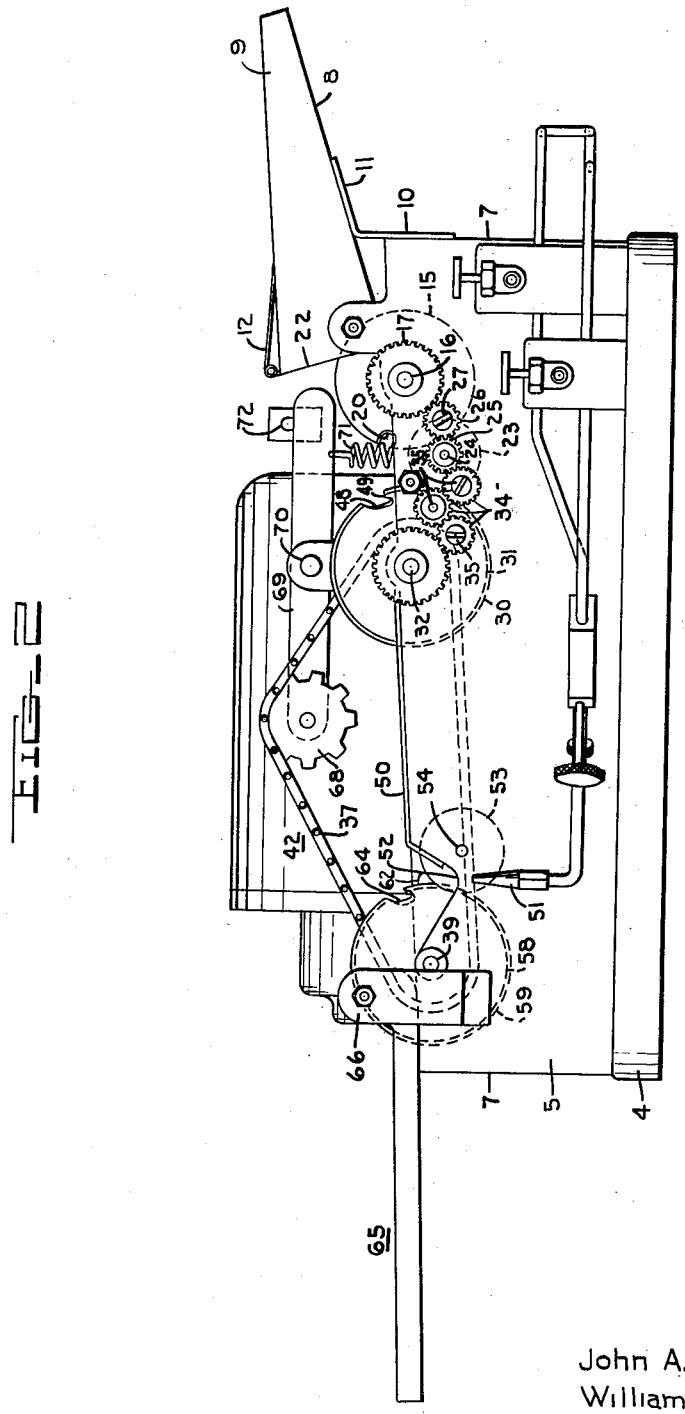

Patented May 29, 1951

2,554,503

UNITED STATES PATENT OFFICE 2,554,503

TUBE SEALING APPARATUS

William T. Rainey, Jr., and John A. Krynitsky, United States Navy

Application July 13, 1945, Serial No. 604,944

6 Claims. (Cl. 49—7)

(Granted under the act of March 3, 1883, as amended April 30, 1928; 370 O. G. 757)

This invention relates to article working apparatus, and more particularly to an apparatus for sealing the ends of tubes and particularly of glass tubes.

In some applications it may be desirable to provide an apparatus for automatically sealing the ends of tubes. For example, in detecting the presence of certain gases and in identifying particular gases, one practice has been to employ detector gels which when exposed to a particular gas react to produce a characteristic color in the gel. A convenient way to employ such gels is to place a quantity of the gel in a glass tube and then to seal the ends of the tube to provide a hermetically sealed container or ampule. When it is desired to use a detector tube formed in this manner, the tube is broken near both ends and thereby the contents of the tube are exposed to the surrounding atmosphere. Where, however, such detector tubes are to be manufactured in large quantities, it is impractical to seal the ends of the tubes by hand because of the length of time required and the difficulty in maintaining required sealing conditions.

An object of the present invention is to provide an efficient and effective apparatus for sealing the ends of tubes and particularly the ends of glass tubes.

In accordance with one embodiment of this invention, a tube sealing apparatus may comprise a hopper from which tubes are fed one at a time to a first sealing station at which a flame is applied for a predetermined period to one end of the tube as the tube is continuously rotated to close that end of the tube and then the tube is moved to a second sealing station whereat a flame is applied to the opposite end of the tube for a similar period as the tube is continuously rotated. After the second end of the tube has been sealed, the tube is transferred to a receiving hopper.

Other objects and advantages of the present invention will be apparent from the following detailed description, taken in conjunction with the drawings, wherein:

Fig. 1 is a plan view of a sealing apparatus constructed in accordance with this invention; and Fig. 2 is a side elevation of the apparatus shown in Fig. 1.

Referring now to the drawings, it will be seen that this apparatus includes a horizontally disposed, base plate 4 on which is mounted a pair of spaced, parallel, vertically disposed, side plates 5 and 6, which together with a pair of end plates 7 form a housing for the apparatus. At the right end of the housing is mounted a hopper 8a of suitable width to accommodate tubes of the length of those to be sealed and comprising a substantially rectangular base plate 8, having a pair of spaced, parallel, side plates 9 extending upwardly at substantially right angles from either side edge thereof. The hopper is supported at a substantial angle from the horizontal by a bracket 10 which is mounted on the right end wall of the housing and provided with an arm 11 which extends upwardly and to the right therefrom to provide an inclined support for the base of the hopper. A retaining member 12 is pivotally mounted on the upper left end of the hopper and extends over the upper surface of the base plate 8 to prevent tubes supported in the hopper from accidentally falling out. In the operation of this apparatus it will be understood that tubes supported in the hopper will tend to roll downwardly to the left because of the inclination of the hopper.

In order to transfer tubes supported in the hopper to the sealing apparatus one at a time, a pair of discs 15 are mounted on a common rotatable shaft 16, being spaced apart somewhat less than the length of a tube and suitably keyed to the shaft to rotate therewith. The shaft 16 extends transversely through and is journalled in the side walls 5 and 6 of the apparatus housing, and one end of the shaft extends through the side wall 5 of the housing a sufficient distance to provide a support for a spur gear 17 which is suitably keyed to the shaft 16. The spur gear 17 may be driven through a gear train which will hereinafter be described. The gear train causes the spur gear 17 to rotate in a counterclockwise direction, as viewed in Fig. 2 and thereby to rotate the spaced discs 15, which are keyed to the shaft 16, in the same direction.

As may be seen in Fig. 2, the discs 15 are each provided with a notch 20 which is formed in the periphery of each disc and is of U-shape. The width and depth of the notches 20 are selected so that a tube may be received therein and the notches are formed at identically located portions of the periphery of each of the discs 15 with respect to the shaft 16. As may be seen in Fig. 1, a cross-piece 21 of similar U-shaped cross-sectional configuration extends between the two notches 20 and is mounted on the discs 15. The peripheries of the two discs 15 extend into the lower left corner, as viewed in Fig. 2, of the hopper and together with a cross-plate 22, which is mounted across the left end of the hopper 7, prevent the tubes in the hopper from rolling out the left end of the hopper. However, as the discs rotate in a counterclockwise direction, once each revolution, the notches 20 will be aligned with the upper surface of the base 8 of the hopper and a single tube will be permitted to roll into the notches. Continuing to rotate, the discs then serve, in cooperation with the cross plate 22, to retain the remaining tubes in the hopper and to carry the one received tube to the left side of the shaft 16, as viewed in Fig. 2, and to deposit the tube on a second pair of spaced, parallel discs 23. These discs are spaced somewhat further apart than the discs 15 and their peripheries overlap the peripheries of the discs 15, as shown. The discs 23 are mounted on and keyed to a driven shaft 24 which is journalled in the sides of the housing, similarly to the shaft 16, and is provided with a spur gear 25, the spur gear 25 being suitably keyed to an end of the shaft 24 which extends through the side wall 5 of the housing a suitable distance. An idler gear 26 mounted on a short stub shaft 27, fixed to the side walls of the housing and extending at right angles therefrom, is engaged by both the gear 25 and the gear 17 so that as the gear 25 is driven, the gear 17 will be driven in the same direction.

The discs 23 rotate in a counterclockwise direction and cause a tube deposited thereon to be carried to the left to bear against the peripheries of two large spaced discs 30 and 31 which are mounted on and keyed to a common shaft 32. The shaft 32 extends transversely through and is journalled in the side walls 5 and 6 of the housing similarly to the previously described shafts 16 and 24. One end of the shaft 32 extends through the side wall 5 a suitable distance to provide a support for a spur gear 33 which is mounted on its outer end and keyed thereto. The discs 30 and 31 are so mounted and spaced that their peripheries extend within the discs 23 and thus when a tube is resting against the peripheries of the discs 30 and 31 it is also supported by the discs 23.

The gear train whereby the gears and shafts associated therewith hereinbefore described are rotated includes in addition to these described gears, three idler gears 34, which are mounted on stub shafts 35 fixed to the side wall 5 of the housing. These idler gears drivably connect the spur gear 33 to the spur gear 25 which in turn causes the spur gear 17 to be rotated. A sprocket gear 36, shown in Fig. 1, is keyed to the opposite end of the shaft 32 from that on which the gear 33 is mounted and is driven by a sprocket chain 37 which passes thereover and over a second sprocket gear 38 mounted on a shaft 39 which is journalled through the sides of the apparatus housing and is spaced substantially to the left of the shaft 32, the sprocket gear 38 being mounted on a portion of the shaft 39 which extends substantially beyond the side wall 6. This extended end of the shaft 39 is provided with a coupling device 40 whereby the shaft 39 is coupled to a drive shaft 41 of a motor 42.

A tube to be sealed having rolled from the notches 20 on to the small discs 23 and having been carried thereby against the peripheries of the large discs 30 and 31 is supported between the discs 30, 31 and the discs 23 and is at the same time rotated continuously in a clockwise direction, since the supporting discs are rotating in a counterclockwise direction. This position comprises the aforementioned first sealing station. Sealing of the tube is accomplished by a flame from a gas jet 45 which is positioned adjacent the side wall 6 of the housing. By rotating the tube continuously, as described, the end of the tube is uniformly exposed to the flame and the speed of rotation of the discs 30 and 31 is selected so that complete sealing is effected in a single revolution of these discs.

For maximum efficiency, it is desirable that the end of a tube be positioned substantially on the axis of the flame, that is immediately above the orifice in the jet 45. To accomplish this the disc 30 is made slightly greater in diameter than the disc 31, thus causing a tube resting on the discs to be raised slightly higher at the disc 30 than at the disc 31. Since the tube is constantly in motion, it will tend to move toward the disc 31 and to bring its lower end to bear against a stop member 46 which is mounted inside the housing on a short shaft 47 threaded in the side wall 5 of the housing. The position of the stop member may be adjusted by rotating the shaft 47 to correctly locate the opposite end of the tube over the jet 45. It will be understood, that the particular adjustment of the position of the stop member 46 depends on the length of the tubes to be sealed and is relatively critical because of the necessity of positioning the end of the tube being sealed substantially over the jet orifice.

In order to transfer a tube from this first sealing station at the completion of the first sealing operation, the discs 30 and 31, as shown in Fig. 2, are each provided with notches 48 which are undercut or recessed somewhat along one side so that the adjacent portion of the periphery of each disc forms a finger 49 which, when the discs are rotated so as to bring the notches into alignment with the discs 23, positively engages and picks up a tube supported between the discs 23 and the discs 30 and 31 and causes it to fall into the recessed portion of the notches.

It will be understood that the rotation of the discs 30 and 31 and the rotation of the discs 15 are so synchronized by a proper selection of the associated driving gears that a tube is deposited from the discs 15 on to the discs 23 and thereby brought to bear against the peripheries of the discs 30 and 31 at a time when the notches 48 will have moved beyond the position at which a tube supported between the discs 30 and 31 and the discs 23 could be picked up; that is, in normal operation, the notches would have just picked up a tube and thus the smooth portions of the peripheries of the discs 30 and 31 are presented to the succeeding tube. Thus the operation of the discs 30 and 31 is synchronized with the rotation of the discs 15 so that immediately after a tube is picked up by the notches 48, the next tube to be sealed is deposited on the discs 23. Consequently, a tube is exposed to the flame from the jet 45 for substantially the entire period required for one revolution of the discs 30 and 31.

When a tube is received in the notches 48, continued rotation of the discs 30 and 31 carries the tube to the left side of the shaft 32 and deposits it on an inclined plate 50 which is mounted on the upper side of the housing. As may be seen in Fig. 1, the side walls 5 and 6 beneath the plate 50 are bent to one side at an angle and extend in this plane for a short distance, and then continue parallel to the plane in which the right portion of the side walls lie. This configuration is desirable in order to expose the unsealed end of the tube, that is the end adjacent the side wall 5, by causing it to extend, as it leaves the inclined plate, beyond the side wall 5 to be positioned over a second gas jet 51 mounted adjacent the side wall 5.

After a tube has been deposited on the inclined plate 50 the weight of the tube causes it to roll to the left and to drop into a quasi V-shaped recess or notch 52 formed in the upper surface of the side walls of the housing 5 adjacent the left end of the plate 50. As the tube drops into this recess, it falls on the upper portions of a pair of spaced discs 53 which are keyed to and mounted on a shaft 54 journalled through the sides of the housing. These discs 53 are substantially the same dimensions as the discs 23 and are similarly rotated in a counterclockwise direction by a spur gear 55 which is mounted on and keyed to a portion of the shaft 54, which extends through the side wall 6. The spur gear 55 is rotated through a train of gears indicated generally at 56 which is driven from a larger spur gear 57 mounted on the shaft 39, hereinbefore described. A pair of large discs 58 and 59 is mounted on and keyed to the shaft 39 and these discs are so spaced that their peripheries extend slightly within the peripheries of the discs 53. Thus as a tube moves to the left on the discs 53, it reaches a point at which it is cooperatively supported between the discs 53 and the discs 58 and 59.

In order to correctly position the unsealed end of the tube over the jet 51, a similar expedient is employed to that employed at the first sealing station. At this second sealing station, a stop member 62, similar to the stop member 46, is mounted on a short stub shaft 63 which is threaded into the inner side of the side wall 6 and the sealed end of the tube is caused to bear against the stop member by making the disc 59 somewhat larger in diameter than the disc 58. Since the discs 58 and 59 and the discs 53 rotate in the same direction, the tube supported thereon will be continuously rotated, and the tube, being tilted slightly downward toward the side wall 6, will move toward the side wall 6 until its sealed end engages the surface of the stop member 62.

A pair of notches 64 which are recessed similarly to the notches 49 formed in the periphery of the discs 30 and 31 are similarly formed in the peripheries of the discs 58 and 59. The rotation of these discs is so timed with respect to the rotation of the discs at the first sealing station, that, as a tube is deposited on the inclined plate 50 and rolls downward to bear against these discs, the notches 64 will have just received the preceding tube and moved past the pick-up point; the discs 58 and 59 thus initially present a smooth peripheral surface to the succeeding tube. The unsealed end of the tube is exposed to the flame from the jet 51 for a period substantially corresponding to the time required for a complete revolution of the shaft 39. It will be apparent that by a proper selection of the gearing associated with the two sealing stations and the speed of the driving motor 42, any desired sealing time may be obtained.

After a tube has been sealed at the second sealing station, it is received in the notches 64, the arrival of which at the pickup point is timed as hereinbefore described, and the tube is transferred to the left, and deposited on an inclined chute 65, which is suitably supported on brackets 66 mounted on the left end of the apparatus housing. A tongue 67, integrally formed with the right end of the chute 65, extends to the right between the left portions of the discs 58 and 59 and prevents a tube from falling between the discs as it leaves the notches 64. A suitable receiving hopper, not shown, may be positioned at the lower end of the chute.

In practice, it has been found that this apparatus, by reason of its automatic positioning features, will operate successfully with tubes of considerably varying lengths, for a single setting of the stops 46 and 62 provided the variations are not greater than the width of the flame from the two sealing jets. However, substantial variations, either in length or width of a tube, may cause a tube to jam at the first sealing station. It will be understood, of course, that if a tube can successfully be transferred to and sealed at the first sealing station, no difficulty will be encountered at the second sealing station. In order to provide an automatic stop mechanism operable in the event that a jam occurs at the first sealing station, a sprocket wheel 68 is rotatably mounted on the left end of a pivotally supported arm 69, the arm 69 being suitably supported substantially at its midpoint by a bracket 70, which is mounted on the base plate 4 of the apparatus. One end of a spring 71 may be attached to the right end of the arm and have its other end suitably fixed to the apparatus to cause the sprocket wheel 68 to engage the underside of the upper pass of the sprocket chain 37 at a point approximately midway between the sprocket wheels 36 and 38. The upperside of the right end of the arm 69 is engageable with a toggle switch 72, whereby when the toggle switch is in its lower position, current is applied to the motor 42. The chain 37 is made somewhat longer than would be required to drivably connect the gears 36 and 38 and the tension of the spring 71 is selected so that the arm, moving in a clockwise direction, tends to pull the center portion of the upper pass of the chain upward, as shown in Fig. 2, to tighten the chain, the relative positions of the arm and the toggle switch being such that when the arm 69 is pivoted slightly in a clockwise direction, the chain will be tightened and the toggle switch may be moved to the "on" position. In the event that a jam occurs at the first sealing station, it will be apparent that the drag on the sprocket gear 36 mounted on the shaft 32 will be substantially increased. Since the sprocket gear 38 continues to rotate, being directly driven by the motor 42, the length of the upper pass of the chain will tend to be shortened, pulling down the left end of the arm 69, and the arm 69 will be pivoted in a counterclockwise direction causing the right end of the arm to pivot the toggle switch 72 upwards and thereby turn off the motor 42. The tube causing the jam is then removed, and the toggle switch pivoted downward to reset the automatic stop mechanism and start the motor. By selecting a toggle switch having a suitable spring mechanism associated therewith, it would be feasible to dispense with the spring 71.

While but one embodiment of this invention has been shown and described, it will be understood that many changes and modifications may be made herein without departing from the spirit or scope of the present invention.

The invention shown and described herein may be manufactured or used by or for the Government of the United States of America for governmental purposes without the payment of any royalty thereon or therefor.

What is claimed is:

1. A tube sealing apparatus including a hopper for supporting a plurality of tubes, a first sealing station, means for transferring a tube from said hopper to said first sealing station, first tube rotating means for rotating a tube at said first sealing station, driving means, means connecting said driving means to said first tube rotating means, a second sealing station, said first tube rotating means including tube transferring means for transferring a tube from said first sealing station to said second sealing station, second tube rotating means at said second sealing station for rotating a tube, means connecting said driving means to said second tube rotating means, and said second tube rotating means including means for removing a tube from said second sealing station.

2. In a tube sealing apparatus; a hopper for supporting a plurality of tubes to be sealed; first and second tube sealing stations; each of said tube sealing stations including a first pair of spaced rotatable discs, a second pair of spaced rotatable discs having different diameters, means mounting said first and said second pairs for rotation about parallel axes so spaced so that the peripheries of one pair of discs extend within the peripheries of the other pair of discs to angularly support a tube with respect to said axes, means for rotating said first and said second pairs of discs in one direction to rotate a tube supported thereon, and a stop member positioned adjacent the small diameter disc of said second pair of discs to engage one end of the supported tube; transfer means for periodically transferring tubes from said hopper to said first sealing station; first station transfer means including means forming a tube carrying slot in the peripheries of the discs of said second pair thereof for transferring a tube from said first station to said second station upon each complete revolution of said second pair thereof; second station transfer means including means forming a tube carrying slot in the peripheries of the discs of the second pair thereof for transferring a tube from said second station upon each complete revolution of said second pair thereof; and means synchronously operating said transfer means, said first station transfer means and said second station transfer means so that a tube is transferred to each of said stations immediately following the transfer of a tube therefrom.

3. In a tube sealing apparatus; a hopper for supporting a plurality of tubes to be sealed; first and second tube sealing stations; each of said tube sealing stations including a first pair of spaced rotatable discs, a second pair of spaced rotatable discs having different diameters, means mounting said first and said second pairs for rotation about parallel axes so spaced so that the peripheries of one pair of discs extend within the peripheries of the other pair of discs to angularly support a tube with respect to said axes, means for rotating said first and second pairs in one direction to rotate a tube supported thereon, and a stop member positioned adjacent the smaller diameter disc of said second pair to engage an end of the supported tube; transfer means for periodically transferring tubes from said hopper to said first sealing station; first station transfer means including means forming a tube carrying slot in the peripheries of the discs of said second pair thereof for transferring a tube from said first station to said second station upon each complete revolution of said second pair thereof; second station transfer means including means forming a tube carrying slot in the peripheries of the discs of said second pair thereof for transferring a tube from said second station upon each complete revolution of said second pair thereof; means synchronously operating said transfer means, said first station transfer means and said second station transfer means so that a tube is transferred to each of said stations immediately following the transfer of a tube therefrom; and means associated with the last named means operable to stop rotation of said discs whenever the drag on said discs increases beyond a predetermined level.

4. A tube working apparatus comprising a first pair of spaced rotatable discs having diameters greater than the diameter of a tube to be worked, a second pair of spaced rotatable discs having diameters greater than the diameter of said first pair, means mounting said first and said second pairs for rotation about parallel axes so spaced so that the peripheries of the discs of one pair extend within the peripheries of the discs of the other pair to form a support for the tube, means for transferring the tube to said support, means for rotating said first and said second pairs in one direction to rotate the tube on said support, and means integral with said second pair of discs for removing the tube from said support.

5. A tube working apparatus comprising a first pair of spaced rotatable discs having diameters greater than the diameter of a tube to be worked, a second pair of spaced rotatable discs having different diameters greater than the diameters of said first pair, means mounting said first and said second pair for rotation about parallel axes so spaced so that the peripheries of the discs of one pair extend within the peripheries of the disc of the other pair to form a tilted support for the tube, means for transferring the tube to said support, a stop member positioned adjacent the small diameter disc of said second pair to engage one end of the supported tube, means for rotating said first and said second pairs in one direction to rotate the tube on said support, and means carried by the discs of said second pair for removing the tube from said support after a period of time determined by the diameters of the discs of said second pair.

6. A tube working apparatus comprising a first pair of spaced rotatable discs having diameters greater than the diameter of a tube to be worked, a second pair of spaced rotatable discs having diameters greater than the diameters of said first pair, means mounting said first and said second pairs for rotation about parallel axes so spaced so that the peripheries of the discs of one pair extend within the peripheries of the disc of the other pair to form a support for the tube, a third pair of spaced discs mounted for rotation about an axis parallel to said axes with the peripheries thereof extending within the peripheries of the discs of said first pair, means forming a tube carrying slot in the peripheries of the discs of said third pair for transferring a tube to said support upon each complete revolution of said third pair, means for rotating said first and said second pairs in one direction to rotate the tube supported thereon, means forming a tube carrying slot in the peripheries of said second pair for removing the tube from said support upon each complete revolution of said second pair, and synchronizing means for controlling rotation of said second and said third pairs so that a tube is transferred to said support immediately following the transfer of a tube therefrom.

WILLIAM T. RAINEY, JR.
JOHN A. KRYNITSKY.

(References on following page)

REFERENCES CITED

The following references are of record in the file of this patent:

UNITED STATES PATENTS

| Number | Name | Date |
|---|---|---|
| 1,455,056 | Koenig | May 15, 1923 |
| 1,489,837 | King | Apr. 8, 1924 |
| 1,674,636 | Cameron | June 26, 1928 |
| 1,844,869 | Hauger et al. | Feb. 9, 1932 |
| 1,949,119 | Gibbs | Feb. 27, 1934 |
| 1,976,239 | Lorenz et al. | Oct. 9, 1934 |
| 2,077,827 | Dichter | Apr. 20, 1937 |
| 2,234,302 | Dichter | Mar. 11, 1941 |

FOREIGN PATENTS

| Number | Country | Date |
|---|---|---|
| 529,324 | France | Sept. 7, 1921 |